United States Patent [19]

Chan

[11] Patent Number: 4,746,945
[45] Date of Patent: May 24, 1988

[54] MINIATURE 110 CAMERA

[75] Inventor: Kwok Y. Chan, North Point, Hong Kong

[73] Assignee: W. Haking Enterprises Limited, North Point, Hong Kong

[21] Appl. No.: 890,488

[22] Filed: Jul. 24, 1986

Related U.S. Application Data

[63] Continuation-in-part of Ser. No. 882,087, Jul. 3, 1986.

[51] Int. Cl.⁴ .................. G03B 13/02; G03B 17/02; G03B 17/42
[52] U.S. Cl. .................. 354/204; 354/212; 354/219; 354/268; 354/288
[58] Field of Search ............. 354/202, 204, 219, 288, 354/212, 266, 268, 275

[56] References Cited

U.S. PATENT DOCUMENTS

| | | | |
|---|---|---|---|
| 684,221 | 10/1901 | Gill | 354/275 |
| 771,416 | 10/1904 | Brownnell | 354/275 |
| 790,123 | 5/1905 | Hall | 354/275 |
| 968,716 | 8/1910 | Vale | 354/275 |
| 1,036,385 | 8/1912 | Vale | 354/275 |
| 1,697,492 | 1/1929 | Bornmann | 354/268 |
| 2,257,424 | 9/1941 | Meyer | 354/275 |
| 3,138,084 | 6/1964 | Harvey | 354/275 |
| 3,523,496 | 8/1970 | Nerwin | 354/288 |
| 3,603,232 | 9/1971 | Jones | 354/212 |
| 3,631,783 | 1/1972 | Jones | 354/288 |
| 3,648,582 | 3/1972 | Nerwin | 354/219 |
| 3,728,949 | 4/1973 | Edwards | 354/212 |
| 3,747,492 | 7/1973 | Penick | |
| 3,782,259 | 1/1974 | Noble | 354/202 |

FOREIGN PATENT DOCUMENTS

| | | | |
|---|---|---|---|
| 644612 | 3/1936 | Fed. Rep. of Germany | 354/268 |
| 1216202 | 12/1970 | United Kingdom | |

Primary Examiner—A. A. Mathews
Attorney, Agent, or Firm—Russell E. Hattis; Stephen R. Arnold

[57] ABSTRACT

A substantially shortened camera for use with the 110 cassette is achieved by removing the customary dispensing spool chamber from the camera entirely, and by configuring the outer surface of the imaging station wall to closely correspond to the confronting wall of the dispensing chamber of the cassette. The rear portion of the camera is completely open to allow direct insertion of a cassette, and the customary loading door is completely eliminated. A storable slide is insertable to be captively retained by slide-engaging grooves so that the slide when inserted covers the otherwise open back of the camera. The slide retaining grooves are configured to lie in the film plane of an inserted cassette so that an inserted slide will strike a film-engaging cocking lever to actuate it to a cocking position. Insertion of the slide thus cocks the system for testing shutter operation with the cassette removed. Loading instructions are presented in diagramatic form on the slide, which is retained by slide-in grooves on the bottom of the camera when the cassette is in place.

23 Claims, 2 Drawing Sheets

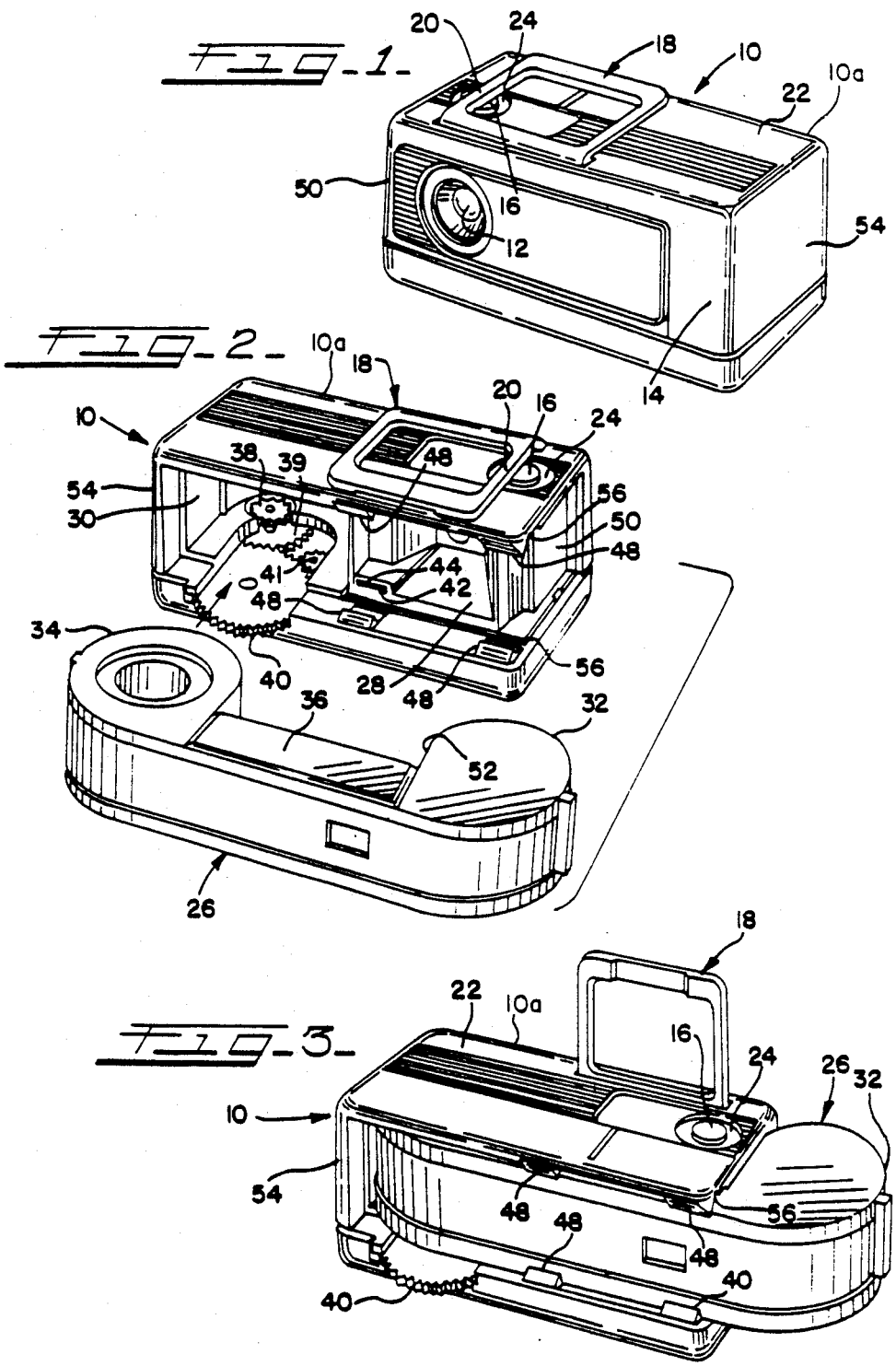

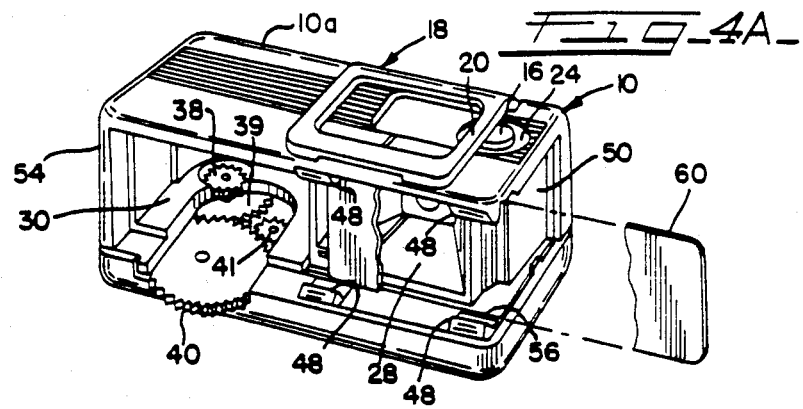
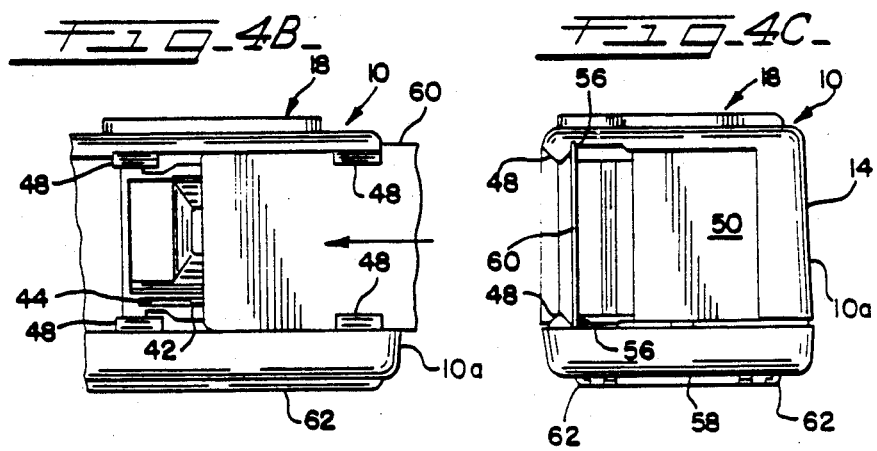
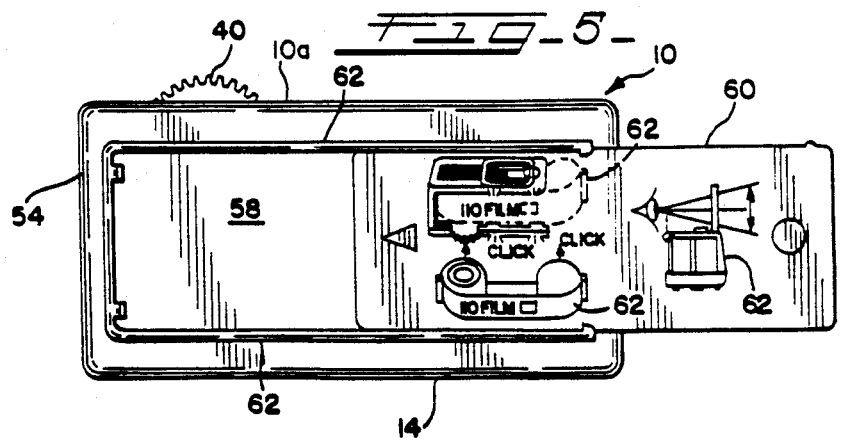

MINIATURE 110 CAMERA

RELATED APPLICATION

This application is a continuation-in-part of U.S. Design patent application Ser. No. 882,087, filed July 3, 1986.

DESCRIPTION

Technical Field of the Invention

The technical field of the invention is still cameras, and in particular cartridge loading systems for cameras designed to accomodate the 110 cartridge.

BACKGROUND OF THE INVENTION

Over the years there has developed a significant market for progressively smaller cameras, frequently designated as "miniatures". These cameras find a ready market for those users who want an extremely compact light-weight camera. Well known among these cameras are those designed to work in conjunction with an industry-standard miniature film cassette generally known simply by the designation "110". This cassette features two generally lobe-shaped sections, one for dispensing the film, the other for winding it about a self-contained take-up spool, the two lobe-shaped sections extending generally towards the scene to be photographed, the sections being joined by a rectangular channel-shaped conduit through which the film is advanced, the conduit being open along the forwardly facing region thereof, Cameras designed to accept these cartridges are normally configured with a loading aperture of one sort or another at the back of the camera and a pair of chambers on either side of the imaging station for insertingly accepting the cartridge dispensing chamber and take-up chamber respectively, so as to place the film conduit centrally disposed on the optic axis of the objective lens of the camera. In an effort to reduce cost to an absolute minimum, certain cameras have occasionally in the past been designed without a conventional loading door and so as to permit direct insertion of a 110 cassette through the permanently open back of the camera, the walls and interior contours of the camera being configured to produce a light-tight seal.

With respect to such cameras which do not have a loading door, but which use the film cartridge itself to seal the back of the camera, unlike the most advantageous form of the present invention to be described, there was no simple and inexpensive protection of the camera interior against dust or other foreign objects when the cartridge is removed in the absence of a separate casing to contain it.

Also, although the 110 camera is in itself a small camera, the doorless cameras described above were not made in the miniaturized form of the present invention. Thus, U.S. Pat. No. 3,138,084 granted June 23, 1964 to D. C. Harvey has a camera housing which is open at the back to receive a 126 film cassette. However, the cassette is located within the confines of the top wall of the camera so that the overall dimensions of the camera are not reduced by the fact that the cassette fits into a doorless opening at the rear of the camera.

Further, it is always desirable to produce as inexpensively as possible a measure of protection against accidental tripping of a cocked shutter, so as to avoid wasting a frame of film.

A further problem from a cost-economics standpoint has to do with cocking the shutter of an unloaded camera. The take-up spool of the 110 cassette has affixed thereto a drive gear which partially extends via a light-tight passage in a forward direction out of a lower portion of the cassette. The corresponding chamber of the camera is provided with a drive gearing system which engages the take-up spool gear when the cassette is inserted, so that actuation of the drive gearing by conventional means causes the take-up spool to rotate to advance the film. Shutter cocking is normally achieved by means of a spring-loaded member coupled to the shutter system which engages an edge perforation of the advancing film, to be cocked by the motion thereof. Since this same motion is indicative of the film travel, the same advancing stroke of the film-engaging member is used to mechanically limit film advance so as to index each frame.

Such simple systems are quite cost-effective; however, if there is no cartridge in the camera, such a cocking motion of the film-engaging member cannot be induced. Thus, if one wishes to test the camera shutter when its operation is suspect, one procedure is to carefully manually engage the cocking member and move it to a cocking position so that the shutter may thereafter be actuated. A significantly costlier approach is to add some other form of coupling mechanism to the camera so that upon actuation of the film-advancing mechanism coupled to the take-up spool, i.e., most typically a thumb wheel, the coupling mechanism will take over the shutter cocking operation when no cassette is present. If cost is to be held to an absolute minimum, it is desirable to avoid the need for such coupling mechanisms.

SUMMARY OF THE INVENTION

According to a feature of the invention, and as disclosed in the preferred embodiment, a reduction in the overall length of the camera body is achieved by completely eliminating the normally present camera chamber which accepts the 110 cassette dispensing section. The camera outer wall on the dispensing side of the imaging station is contoured to closely accept a portion of the standard lobe contour of the dispensing section of a 110 cassette. The camera body is thus substantially shortened over the prior art. According to a specific feature of the invention, the camera loading system is of the direct insertion variety, thereby eliminating the loading door, and having a snap-in retention feature.

According to a further specific feature of the invention, the camera is provided with capture grooves preferably aligned along the film plane of an inserted cassette, and there is further provided a rectangular slide which can be slidingly inserted along these grooves to provide the desired dust and foreign object protection when the camera is in the unloaded state. By placing the capture grooves for this slide in the film plane of an inserted cassette, insertion of the slide automatically engages the shutter cocking member normally cockingly driven by the film during film advance. With the shutter thus in the cocked condition, shutter operation may be visually checked by simply withdrawing the slide and watching for a flash of light passing through the lens when the shutter release is operated. No extra linkages whatever are necessary in the cocking system to provide this useful feature.

According to related features of the invention, additional capture grooves are provided on ribs extending along one major surface of the camera, most preferably the bottom surface, these grooves being configured to storingly accept an inserted slide. The chance of misplacing the slide is thus greatly minimized. According to a further related feature of the invention, specific loading instructions for inserting the film cartridge into the camera are printed in pictorial form on the slide. The slide may thus be removed and held alongside the camera with the camera in its proper orientation, so that the inexperienced user will immediately be informed how to load the camera.

Finally, according to a further feature of the invention, a flip-up frame-type viewfinder is mounted on the top surface of the camera. The shutter release button is located on the top surface of the camera within a small recess so as not to protrude above the contours of the camera top surface. The finder and shutter release button are so positioned that with the finder in the folded-down position a portion of the finder frame protectingly overlies the shutter release button. Accidental tripping of the shutter is therefore effectively prevented.

Other features and aspects of the invention will become apparent upon making reference to the specification, claims, and drawings to follow.

DESCRIPTION OF DRAWINGS

FIG. 1 is a front perspective view of the camera of the present invention in the unloaded state.

FIG. 2 is a rear perspective view of the camera showing a cartridge positioned for insertion.

FIG. 3 is a rear perspective view of the camera showing an inserted cartridge, and further showing a viewfinder in the deployed condition.

FIG. 4A is a rear perspective view of the camera in the unloaded state showing a partially inserted dust protection slide, the slide being shown in breakaway form.

FIG. 4B is a partial rear elevation of the camera showing the region of a cocking member or lever.

FIG. 4C is a side elevational view of the camera showing the protecting slide in place.

FIG. 5 is a bottom view of the camera showing the protecting slide partially inserted into storage ribs, and further showing graphical operator instructions thereon.

DESCRIPTION OF THE INVENTION

With reference to the figures, FIG. 1 shows the camera 10 of the present invention. It will be noted that the objective lens 12 is disposed substantially towards one end of a front wall 14. The camera 10 includes a housing 10a which is of generally rectangular configuration, and is provided with a deployable flip-up viewfinder frame 18 and a shutter release button 16 mounted in a recess 24 in the top wall 22 of the camera housing. It will be noted that a portion 20 of the viewfinder frame protectingly covers the shutter release button in the stored position as shown, thereby preventing accidental actuation of the shutter.

FIG. 2 is a rear perspective of the camera 10 with a cassette 26 disposed therebehind for loading. It will be noted that the entire rear portion of the camera 10 is open, and the rear interior of the housing consists principally of two regions, namely an imaging station 28 and a drive chamber 30. The defining wall 54 of the drive chamber constitutes the left hand terminus of the housing of the camera 10. The 110 cassette 26 is of conventional configuration having a generally lobe-shaped end sections 32,34. The end section 32 defines therein a dispensing chamber containing unexposed film. The other lobe-shaped end section 34 defines a take-up chamber containing a take-up spool to which the film leader is attached, and from the bottom of which extends a portion of a take-up spool drive gear (not shown). The two lobe-shaped end sections 32,34 are joined by a generally rectangular open-faced conduit 36 through which the film passes, presenting sequential frames of the film at the imaging station as they are advanced.

When the cassette 26 is inserted into the rear of the camera 10 (see in particular FIG. 3), the take-up spool drive gear engages an intermediate gear 38 in the drive chamber 30, this gear 38 being in turn driven by an operator-actuated thumb wheel gear 40 via gear 39. The gear 38 relays this motion to the take-up spool drive gear to advance the film. A cocking lever 42 movable within a laterally disposed slot 44 extends slightly rearward so as to engage with and be driven by the advancing film. Motion of this lever to the left will cock the shutter and interact with the gearing system 38,39,40,41 to terminate film advance by means well known in the art.

As shown in FIG. 3, the cassette 26 can be snapped into the rear of the camera to engage with the take-up spool drive gear 38, and to form a light-tight seal with respect to the camera interior. Cassette retention is achieved by snap-in action to be captively held by resilient fingers 48—48. The righthand wall 50 of the camera 10 is contoured to form a close fit with the dispensing section inner wall 52 of the cassette 26. With the camera 10 so configured, a substantially shorter camera body is achieved over the prior art. A similar configuration is possible with respect to the drive chamber wall 54, in that at least some of the lefthand portion of the camera could similarly be removed; however, gear 38 must be present to engage the industry-standard take-up spool of the cassette 26, and therefore, only a relatively small portion of this side of the camera could be similarly removed.

Referring specifically to FIGS. 4A–4C, slide grooves 56 are provided in rear portions of the housing top wall 22 and the bottom wall 58, and a thin rectangular protective slide 60 is configured so that it may be inserted and slid along these grooves and along the length of the back of the camera 10 to provide a dust-sealing feature. Moreover, the grooves 56 are preferably disposed to lie along the film plane of an inserted cassette. The result is that when the slide 60 is inserted, it will contact the cocking lever 42 and urge it to the left to a cocked position. To test the camera, one simply withdraws the slide and looks through the lens as the shutter release system is actuated. Thus the slide serves the double purpose of sealing the camera and also providing for shutter cocking, thus eliminating the need for any form of additional auxiliary cocking mechanism for cocking the shutter when the camera is empty. Similar principles may be applied to conventional 100 cameras of the doorless type, simply by providing for a slide entry slot in the side of the housing which accepts the dispensing spool section of the cassette.

To prevent loss of the slide 60, a pair of parallel grooved ribs 62 are provided on the bottom surface 58 of the camera 10. The slide may simply be inserted for storage as shown in FIG. 5. As a further convenience, on the surface of the slide 60 are instructional drawings 62—62 which show the operator how to insert the cartridge. It is frequently experienced that those unfamiliar with 110 cameras frequently attempt to load the dispensing section 32 of the cassette into the drive chamber 30, i.e., they frequently are confused with respect to proper orientation of the generally symetrical cassette 26. The camera 10 may therefore be properly oriented with the slide 60 placed alongside of it, so that the user is presented with the proper orientational view of the camera as he carries out the loading operation according to the instructional diagrams 62—62.

Thus, there has been produced a 110 camera body of substantially reduced size, which allows for cassette insertion and removal without the use of a loading door, which further provides for a storable dust protection slide which not only protects the interior of the camera when not loaded, but which also can be used as a cocking slide to test shutter operation. All of the foregoing have been accomplished, in particular the shutter testing mechanism, in an extremely low-cost system.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention, in appropriate instances even the specific claims involved should be construed in light of the doctrine of equivalents.

We claim:

1. In a camera for use with a cassette having lobe-shaped laterally projecting dispensing and take-up end sections respectively forming therein a film dispensing chamber and a take-up chamber, said take-up chamber including a take-up spool having an externally accessible drive gear attached thereto, said lobe-shaped sections being interconnected by a substantially straight conduit-forming section interconnecting the dispensing and supply sections, said camera including a housing with shutter cocking and release means and user-operated film winding means, said housing having a cassette insertion aperture at the back thereof which exposes the rear interior of said housing and means for releasably retaining an inserted cassette, the rear interior of said housing having at one portion thereof an imaging station for receiving said conduit-forming section of an inserted cassette and having adjacent to said imaging station at least partial take-up section accepting chamber configured to accept said cartridge take-up section, said take-up section-accepting chamber of said housing having gearing means coupled to said film winding means for engaging and driving said take-up spool drive gear, the improvement comprising:
said housing being configured so that at least the outermost end of said cassette dispensing section of said inserted cassette extends beyond the maximum lateral dimension of said housing, said housing including a wall disposed between said imaging station and the confronting inner portion of said dispensing section of an inserted cassette.

2. The camera of claim 1 wherein said housing is configured so that substantially all of said cassette dispensing section extends beyond said housing, said outer surface of said imaging station wall being configured for close engagement with said confronting inner portion of said dispensing section of an inserted cassette.

3. The camera of claim 2 wherein said take-up section-accepting chamber of said housing is configured to substantially fully enclose said take-up section.

4. The camera of claim 1, 2, or 3 wherein there is provided in said take-up section-accepting chamber of said housing gearing which is disposed to engage with said take-up spool drive gear, said gearing including a thumb wheel actuator for moving said gearing and which projects from said housing.

5. The camera of claim 1 wherein said means for retaining said cassette includes resilient finger-forming projections which snap-fit into engagement with the rear of the cassette when it is fully inserted within the housing.

6. The camera of claim 1 wherein said cassette insertion aperture is doorless, and portions of the walls of an inserted cassette make a light-tight sealing relationship with adjacent portions of the camera housing.

7. The camera of claim 1 wherein said dispensing section of an inserted cassette is manually accessible and release of the cassette from engaging with the housing body is achieved via a rearward movement thereof.

8. The camera of claim 1 wherein said shutter cocking means includes a cocking member for cocking said shutter release means, said cocking member being disposed to engagingly enter a film perforation and to be displaced in a given direction by an advancing film to cock the shutter, and guide means for guiding an inserted aperture cover slide configured so as to cover said insertion aperture, said guide means being disposed to align said slide so that during movement in one direction said slide engages and moves said cocking member in said given direction to cock said shutter.

9. The camera of claim 8 wherein said guide means are disposed to accept said cover slide for insertion from the side of said housing proximate to said imaging station wall, said take-up section-accepting chamber of said housing being configured to surround all sides of said cassette take-up section, said cover slide and guide means being configured so that said slide when inserted confrontingly seals said housing at the back of said imaging station and said take-up section-accepting chamber.

10. The camera of claim 1 wherein said shutter release means includes a shutter release button and a viewfinder having at least one generally planar framing member serving to define the field of view and operable between a stored position disposing said framing member to lie generally against one face of the camera housing and a deployed position standing generally perpendicular thereto, and a shutter release button placed on said one face of said housing and positioned so that with said framing member in said stored position at least a portion thereof closely confronts said shutter button so as to protect against accidental shutter actuation.

11. The camera of claim 10 wherein said shutter botton and said framing member are disposed on the top of said camera housing and said shutter button is disposed within a recess in said housing.

12. In a camera for use with a cassette having lobe-shaped laterally projecting dispensing and take-up end sections respectively forming therein a film dispensing chamber and a take-up chamber, said lobe-shaped sections being interconnected by a substantially straight conduit-forming section interconnecting the dispensing and supply sections, said camera having an aperture in the rear thereof for accepting an inserted cassette and having a cocking member disposed to engagingly enter a film perforation and to be displaced in a given direction by an advancing film to cock the shutter, the improvement comprising:

guide means for guiding an aperture cover slide configured so as to cover said aperture, said guide means being disposed to align said slide so that during movement in one direction said slide engages and moves said cocking member in said given direction to cock said shutter.

13. In a camera having a shutter release button and a viewfinder having at least one generally planar framing member serving to define the field of view and operable between a stored position disposing said framing member to lie generally against one face of the camera housing and a deployed position standing generally perpendicular thereto, the improvement comprising:

a shutter release button placed on said one face of said housing and positioned so that with said framing member in said stored position at least a portion of said framing member confronts said shutter button so as to protect against accidental shutter actuation.

14. The camera of claim 13 wherein said shutter button and said framing member are disposed on the top of said camera housing and said shutter button is disposed within a recess in said housing.

15. The camera of claims 9 or 12 in combination with said slide.

16. The camera of claim 12 in combination with said slide, said slide bearing indicia thereon in the form of pictorial loading instructions.

17. The camera of claim 9 wherein said housing is provided with retaining means for captively storing said slide on the bottom of said housing.

18. The camera of claims 1, 2, 3 or 6 including said cassette.

19. The camera of claim 4 wherein said gearing is provided in the bottom of said housing.

20. The camera of claim 4 wherein said thumb wheel actuator projects rearwardly from the rear of said housing.

21. The camera of claim 4 wherein said thumb wheel actuator projects rearwardly from the bottom portion of the rear of said housing.

22. The camera of claim 3 wherein said housing is configured so that said dispensing section of an inserted cassette is manually accessible and release of said cassette from engagement with the housing body is achieved only via a rotating movement of said dispensing section about said take-up section-accepting chamber.

23. The camera of claim 15 wherein said housing is provided with retaining means for captively storing said slide on the bottom of said housing.

* * * * *